United States Patent [19]
Jonas

[11] 3,966,985
[45] June 29, 1976

[54] FLAVORING AGENT OBTAINED BY REACTING A MONOSACCHARIDE AND A SUPPLEMENTED PLASTEIN

[75] Inventor: David Andrew Jonas, Ramsgate, England

[73] Assignee: Pfizer Inc., New York, N.Y.

[22] Filed: Apr. 22, 1975

[21] Appl. No.: 571,010

Related U.S. Application Data

[63] Continuation-in-part of Ser. No. 548,916, Feb. 11, 1975, abandoned.

[30] Foreign Application Priority Data

Feb. 18, 1974 United Kingdom............... 7350/74

[52] U.S. Cl................................. 426/533; 426/802
[51] Int. Cl.²......................................... A23L 1/231
[58] Field of Search............................. 426/65, 533

[56] References Cited
UNITED STATES PATENTS

| | | | |
|---|---|---|---|
| 2,934,437 | 4/1960 | Morton et al.................... | 426/65 |
| 3,365,306 | 1/1968 | Perret............................... | 426/65 |
| 3,532,515 | 10/1970 | Brodereck et al................ | 426/65 |
| 3,620,772 | 11/1971 | Kitada et al...................... | 426/65 |
| 3,716,380 | 2/1973 | de la Potterie.................. | 426/65 |
| 3,741,775 | 6/1973 | Lee................................... | 426/65 |
| 3,761,287 | 9/1973 | Jaeger.............................. | 426/65 |

OTHER PUBLICATIONS

Yamashita et al., Plastein Reaction as a Method for Enhancing the Sulfur-Containing Amino Acid Level of Soybean Protein, J. Agr. Food Chem., vol. 19, No. 6, 1971, pp. 1151–1154.

*Primary Examiner*—Joseph M. Golian
*Attorney, Agent, or Firm*—Connolly and Hutz

[57] ABSTRACT

A process for preparing a flavoring agent by reaction of a monosaccharide and a plastein supplemented with a sulfur-containing amino acid in the presence of water at 80° to 120°C., and the product thereby obtained, as well as meat-flavored textured protein compositions having incorporated therein 0.1 to 10% by weight of the above flavoring agent.

17 Claims, No Drawings

FLAVORING AGENT OBTAINED BY REACTING A MONOSACCHARIDE AND A SUPPLEMENTED PLASTEIN

CROSS-REFERENCE TO RELATED APPLICATION

This is a continuation-in-part of my copending application Ser. No. 548,916, filed Feb. 11, 1975 now abandoned.

BACKGROUND OF THE INVENTION FIELD OF THE INVENTION

This invention relates to flavoring agents and particularly to agents for imparting a meat flavor to protein compositions, especially textured vegetable proteins. The invention is also concerned with flavored protein compositions, particuarly flavored textured vegetable protein compositions, which have been flavored with the said flavoring agents.

DESCRIPTION OF THE PRIOR ART

U.K. Pat. No. 1,082,504 describes and claims a process for preparing a beef-flavored substance which comprises heating in admixture, a hexose or pentose monosaccharide with cysteine, in the presence of water, until a beef-flavored mixture is obtained, adding for each part by weight of said beef-flavored mixture from 5 to 15 parts of vegetable protein hydrolysate and from 0.5 to 1.5 parts of a 5'-ribonucleotide and heating for about 2 hours at least 70° C. U.K. Pat. No. 1,135,123, which is a Patent of Addition to U.K. Pat. No. 1,082,504, describes and claims a similar process and includes the use of cystine as the amino acid.

It has now been found that a process similar to that disclosed in U.K. Pats. No. 1,082,504 and 1,135,123, and in the corresponding U.S. Pat. No. 3,365,306, but involving the reaction of supplemented plasteins with monosaccharides provides improved meat flavor compositions.

The plastein reaction is known to be an enzymatic process for the growth of peptide chains e.e., the reversal of the usual protein degradation by proteinase (see for example, Yamashita et al., J. of Agric. and Food. Chem., 19, 1151 (1971), and references cited therein. Thus, plasteins are a mixture of protein-like high molecular weight compounds formed from lower molecular weight fragments. The plasteins which have been found to be advantageous for the production of flavoring agents are those which have been supplemented with sulphur-containing amino acids, for example methionine or cysteine. Since the presence of low molecular weight peptides or free amino acids may lead to off flavors, they may optionally be removed, for example, dialysis or fractional precipitation.

Mean flavors are formed by the reaction of these supplemented plasteins with monosaccharides (hexose or pentose) in water at elevated temperature, this reaction being known as the Maillard reaction, the reaction of the amino group of an amino acid moiety with the glycosidic hydroxyl group of a monosaccharide, followed by other, more complex changes which result in the formation of brown pigments (See the Merck Index, 8th Edition, p. 1189, 1968).

The flavor may be modified by the addition of known flavor modifiers such as monosodium glutamate, before reaction with the monosaccharide.

SUMMARY OF THE INVENTION

The invention comprises a process for preparing a flavoring agent by reacting a mixture of one part by weight of a hexose or pentose monosaccharide and from about one to twenty parts by weight of plastein supplemented with about 5 to 50% by weight, based on the supplemented plastein, of a sulfur-containing amino acid selected from the group consisting of methionine, cysteine, cystine and lanthionine, in water at a temperature from about 80° to 120° C., and the flavoring agent prepared by the said process. The invention also provides a meat-flavored textured protein composition having incorporated therein from about 0.1 to 10% by weight based on the dry weight of textured protein, of the flavoring agent prepared by the above-mentioned process.

DETAILED DESCRIPTION OF THE INVENTION

The present invention provides a process for the preparation of a flavoring agent which comprises mixing together one part by weight of a hexose or pentose monosaccharide and from 1 to 20 parts by weight, preferably from 4 to 10 parts by weight, of a plastein supplemented with about 5 to 50% by weight, preferably 15 to 20% by weight, of a sulfur-containing amino acid, and heating the mixture in water at a temperature in the range of about 80° to 120° C. If desired, the flavor may be further improved by including in the mixture, preferably before heating, a flavor modifier, e.g., monosodium glutamate.

Preferably, the heating is conducted for at least four hours at 100° C., although the heating period may be correspondingly shorter or longer at higher or lower temperatures, respectively. When conducting the reaction at a temperature at the upper end of the specified range, i.e. above 100° C., it will clearly be necessary to operate under an elevated pressure.

It has been found in accordance with the invention that the heating period necessary to complete reaction varies according to the monosaccharide used. For example, a hexose (such as glucose) requires a period of at least 20 hours at 100° C. or at least 5 hours at 120° C. (under elevated pressure), while a pentose (such as ribose) requires only 4 hours at 100° C. or 1 hour at 120° C.

As already mentioned, the preferred ratio (by weight) of monosaccharide to plastein is in the range from 1:4 to 1:10, and it has been found in accordance with the invention that ratios lower than 1:10 impart rather weak flavors to protein compositions in which the flavoring agent is incorporated. As the ratio is increased above 1:10, undesirable off-flavors begin to appear in such compositions, but these only become strong at ratios above 1:4. Thus the optimum ratio is about 1:10.

The monosodium glutamate may be included in the mixture at ratios of one part to from one to ten parts by weight of plastein, preferably one part to about five parts by weight of plastein. At a ratio of less than 1:5 the flavor improvement is rather weak, while at ratios above 1:5 little further advantage is obtained.

The water content of the mixture is also important for flavor quality and depends on the monosaccharide used. The amount of water present should in all cases be such as to provide at least two parts by weight of water for each part of supplemented plastein. With a pentose (such as ribose) improvement in flavor quality increased with amounts of water up to five parts by weight of water, but further increasing the amount of water, although not deleterious as to flavor quality, merely dilutes the product. The preferred ratio of water to supplemented plastein when a pentose is used is therefore about 5:1. With a hexose (such as glucose), however, improvement in flavor quality continues with increasing amounts of water up to twenty parts by weight of water. The preferred ratio of water to supplemented plastein when a hexose is used is therefore about 20:1.

Since the optimum ratio of plastein to monosaccharide is about 10:1 and the preferred ratio of plastein to monosodium glutamate is about 5:1, the preferred water content of the total mixture before heating, when a pentose is used, is 5 parts by weight of water in 6.3 parts of the mixture, i.e. about 80% water by weight, and when a hexose is used, is 20 parts by weight of water in 21.3 parts of the mixture, i.e. about 94% water by weight.

The invention also provides a flavoring agent whenever prepared by the above process.

The supplemented plastein used in the process of this invention initially may be prepared from a hydrolysed protein, e.g. digest derived from soya protein, safflower protein, peanut protein, cottonseed protein or other vegetable protein, fish protein or microbial protein, such as fungal protein, with a proteolytic enzyme, e.g., pepsin. The hydrolysed protein is concentrated; to the concentrate is added a suitable derivative of a sulfur-containing amino acid which serves as the source of the sulfur-containing amino acid. The supplemented plastein is then prepared by incubating the hydrolysed protein together with the derivative of the sulfur-containing amino acid in the presence of a further amount of enzyme such as pepsin, papain, ficin or Nagarase (a commercial preparation of an alkaline proteinase produced by *Baccilus subtilis*); however, pepsin is preferred, under conditions such as to cause polycondensation to occur. Preferred plasteins are those supplemented in this manner with methionine, cysteine, cystine or lanthionine. Suitable derivatives of the sulfur-containing amino acids are the alkyl esters or the salts of the alkyl esters. Preferred alkyl groups in the alkyl esters of the sulfur-containing amino acids are those having from about one to four carbon atoms. Examples of suitable derivatives are the methyl ester of DL-methionine, ethyl ester of L-methionine, n-propyl ester of DL-cysteine, isopropyl ester of L-cysteine, n-butyl ester of DL-cysteine hydrochloride, dimethyl-L-cystine, dimethyl-L-cystine dihydrochloride, diethyl-DL-cystine sulfate, diisobutylmeso-lanthionine, dimethyl-L-lanthionine dihydrochloride and diethyl-D-lanthionine dihydrobromide.

The alkyl group of the alkyl ester of the sulfur-containing amino acid is eliminated by hydrolysis during the course of the reaction to form the supplemented plastein in which the sulfur-containing amino acid is held in a state of peptide bonding.

The term, "plastein supplemented with a sulfur-containing amino acid", as used herein, refers to the product of the above-described reaction in which:

a. peptide fragments derived from the protein hydrolysate and b. sulfur-containing amino acid fragments derived from a derivative of the sulfur-containing amino acid, e.g., the alkyl ester are held together by peptide bonding to form a higher molecular weight protein-like substance.

The preparation of plastein from hydrolyzed protein has been known for a very long time and the conditions for plastein formation are also well known (See, for example, Cuthbertson et al., Biochem. J. 1931, 25, 2003). Supplementation with methionine has also been previously described by Yamashita, et al., J. Agric. Food Chem., 1971, 19, 1151.

The product may be either dried as such, for example by freezedrying, or further treated by dialysis or fractional precipitation, e.g. with ethanol, to remove undesirable by-products which might produce off-flavors.

The amount of sulfur-containing amino acid derivative which may be used in the process of the invention for supplementing the plastein can vary within wide limits but is normally an amount calculated to provide a supplemented plastein containing from about 5 to 50% by weight of the sulfur containing amino acid, based on the supplemented plastein, and preferably from about 15 to 20%, since lower proportions lead to weaker meat flavors in the ultimate product while proportions greater than 20% can lead to the appearance of off-flavors.

The supplemented plastein prepared as described above is then heated with water and the hexose or pentose monosaccharide, and optionally the flavor modifier, monosodium glutamate, to produce a flavoring agent according to the invention.

While any of the hexose and pentose monosaccharides may be employed in the process of the invention, for example, pentoses such as ribose, arabinose, xylose, lyxose and deoxribose; and hexoses such as glucose, mannose, galactose, gulose, allose, rhamnose, fructose and sorbose, the preferred monosaccharides are glucose, ribose and arabinose because of their ease of availability and the flavor quality and potency of the product obtained when they are employed.

A particular advantage of meat flavors formed from plasteins according to the process of the invention is their property of being only slowly liberated from protein compositions containing them when the latter are chewed. They are thus useful for flavoring materials requiring a good deal of chewing, such as textured proteins and especially textured vegetable proteins such as soya protein. In such a situation, it may be advantageous to supplement the plastein derived meat flavor with a more rapidly released meat flavor which may be of synthetic or natural origin, for example, the beef-flavored substances of U.S. Pat. No. 3,365,306 and U.K. Pat. Nos. 1,082,504 and 1,135,123, and the chicken and beef flavored products marketed by Pfizer Inc., under the Trade Mark "Corral", or they may be or natural origin, for example, natural meat stocks or extracts.

The flavoring agents of the present invention may be incorporated in the finished textured protein product, together with other meat flavors if desired, by contacting the protein product with an aqueous solution containing the flavoring agents. It has been found, in accordance with a further aspect of the invention, however, that the flavoring agents of the present invention can be incorporated in the textured protein before it is shaped into its finished form, e.g. by incorporation in the protein before extrusion at high temperature and pressure, since the flavoring agents of the present invention are not inactivated at the high temperatures and pressures used in such processes, e.g. temperature of about 100° to 150° C. and pressures of about 300 to 3000 pounds per square inch.

Textured protein products may be defined as food products made from edible protein sources and are characterized by having structural integrity and identifiable texture such that each unit will withstand hydration in cooking and other procedures used in preparing food for consumption. Textured proteins, especially textured soya protein are well known in the art, see for example, Gutcho, "Textured Foods and Allied Products," Noyes Data Corporation, 1973, and references therein.

Examples of proteins which may be employed in the invention to form the above described compositions in which the flavoring agents of the invention are incorporated into the textured products or incorporated into the protein product prior to texturizing by extrusion are soya protein, safflower protein, peanut protein, cottonseed protein, casein, fish protein, microbial proteins and other edible protein and protein containing products well known to those skilled in the art.

Accordingly, the present invention further provides a textured protein composition, especially a meat-flavored textured vegetable protein composition, which comprises a textured protein, for example, a textured vegetable protein, having incorporated therein from 0.1 to 10 percent by weight, preferably from 0.75 to 6% by weight, of a flavoring agent of the invention, based on the dry weight of textured protein.

The following Examples illustrate the preparations of flavoring agents according to the invention and the production of textured protein compositions incorporating such flavoring agents. Unless otherwise stated, all percentages are by weight and temperatures are in °C. In all cases, pepsin used is 1:10,000 grade.

EXAMPLE 1 a. Hydrolysis of Soya Protein

A commercial soya protein isolate, Fujipro M, is used as starting material.

500 g. of Fujipro M is dissolved in 22.5 liters of demineralized water and the pH adjusted to 1.60 with hydrochloric acid. The solution is heated to 37° and 5.0 g. of pepsin is added, the whole is then incubated at 37° for 40 hours by which time the nitrogen containing material is 98.5 soluble in 10% trichloro-acetic acid (TCA). The mixture is boiled for 15 minutes, adjusted to pH 5.0 with aqueous sodium hydroxide and filtered. The filtrate contains 0.26% w/v nitrogen of which 99.3% is soluble in 10% TCA. The filtrate is then concentrated to about 40% protein by evaporation under reduced pressure at 40° C., to give a substrate which is suitable for plastein formation.

b. Plastein Formation with Methionine Supplementation 50.0 ml. of concentrated peptic digest obtained as in (a) and containing 46.6% w/v protein with a degree of proteolysis of 99.3% (i.e. 99.3% of nitrogen is soluble in 10% TCA) is mixed with 5.0 g. of L-methionine ethyl ester and the whole is heated to 37° C., for 24 hours.

The product may be freeze dried and as such contains 77.1% of its nitrogen soluble in 10% TCA, representing a plastein yield of 20.5% based on the hydrolyzed protein plus methionine.

Alternatively, the product may be dialyzed against demineralized water for 48 hours, which lowers the amount of TCA soluble nitrogen to 56.2%, and subsequently freeze dried. Either product may be used for flavor formation, though the dialyzed material is preferable.

c. Flavor Agent Formation 1.0 g. of the dialyzed powder prepared above, 0.5 g. of ribose and 0.3 g. of monosodium glutamate are heated in 10 ml. of water at 100° C. for 4 hours and freeze dried. The resulting product has the flavor of cooked beef.

EXAMPLE 2 a. 5 Kg. of Fujipro M is suspended in 200 liters of demineralized water and the pH adjusted to 1.6 with 1.4 kg. of concentrated hydrochloric acid. The mixture is then heated to 50°, 50 g. of pepsin (1:10,000 grade) is added and the whole is heated and stirred at 50° for 4 hours. The temperature is then raised rapidly (in 15 minutes) to 80°, while 40% caustic soda is added to raise the pH to 5.0, and held at 80° for 30 minutes. After cooling overnight, the pH of the mixture is readjusted to 5.0 with caustic soda, thus using a total of 600 g. sodium hydroxide. The product is filtered and concentrated to a protein content of about 46% in a fnal volume of 7 liters. The protein content is 80.2% soluble in TCA, i.e. has a degree of proteolysis of 80.2%, and has an average molecular weight of 1050, as determined by end-group analysis.

b. To 6.5 liters of the product of (a) containing 3 kg. of hydrolyzed protein (80.2% soluble in 10% TCA) is added 750 g. (25%) of DL-methionine ethyl ester and the pH of the solution is adjusted to 4.5 with 300 ml. of concentrated hydrochloric acid. The solution is then heated to 65°, 4 g. of pepsin is added and the whole is maintained at 65° for 24 hours to yield a viscous aqueous paste containing 3.62 kg. of plastein. The plastein thus produced has a methionine content of 550 g. (15%) and contains 45.4% of its nitrogen soluble in 10% TCA (representing a plastein yield of 35%) and an average molecular weight of 5,800.

Suspension of this material in 75 liters of industrial methylated spirit (93:5 ethanol:methanol mixture) and stirring for 2 hours yields an insoluble precipitate which, after filtration and drying in vacuo, yields 3.55 kg. of a white powder, containing 95% plastein with an average molecular weight of 6,400.

c. 800 g. of the paste obtained in (b), before precipitation with methylated spirit, containing 375 g. of plastein, is mixed with 40 g. ribose, 80 g. monosodium glutamate and 2.0 liters of water, heated under reflux for 4 hours, cooled and made up to 2.5 liters with water. The product is an aqueous solution containing about 20% by weight of a flavoring agent according to the invention, and comprising 15% (g./100 ml.) plastein.

EXAMPLE 3

The procedure of Example 2 is repeated, using amounts of DL-methionine ethyl ester in part (b) varying from 150 g. to 3 kg. (5% to 100% by weight, based on the hydrolyzed protein) to afford supplemented plastein products containing from 5% to 50% methionine. When these products are used in part (c), all the flavoring agents product demonstrate acceptable meat flavor, but those made from products containing 15 to 20% methionine are of especially good flavor quality and strength.

EXAMPLE 4

The procedure of Example 2 is repeated using DL-methionine ethyl ester hydrochloride in part (b) in place of the free ester, with similar results.

EXAMPLE 5

The procedure of Example 2 is repeated using the following sulfur-containing amino esters or salts thereof in part (b) in place of DL-methionine ethyl ester with similar results.

L-cysteine ethyl ester hydrochloride monohydrate
DL-cysteine methyl ester
L-cysteine n-butyl ester
DL-cysteine isobutyl ester hydrochloride
L-methionine isopropyl ester
DL-methionine n-propyl ester hemisulfate
DL-methionine methyl ester
L-cystine diethyl ester
L-cystine dimethyl ester dihydrochloride
DL-cystine di-n-butyl ester
DL-cystine di-n-butyl ester dihydrobromide
a mixture of DL and meso lanthionine dimethyl esters
meso lanthionine diethyl ester
DL-lanthionine dimethyl ester dihydrochloride

EXAMPLE 6

The procedure of Example 2 is repeated using amounts of ribose in part (c) varying from 18 to 375 g. with similar results.

EXAMPLE 7

The procedure of Example 2 is repeated using an equal weight of glucose or arabinose in place of ribose in part (c), and heating under reflux for 20 hours, with similar results.

EXAMPLE 8

The procedure of Example 2 is repeated using amounts of monosodium glutamate varying from 35 to 400 g. with similar results.

EXAMPLE 9

The procedure of Example 2 is repeated, except that in part (c) heating is carried out (under elevated pressure) at a temperature of 120° for 1 hour, with similar results.

EXAMPLE 10 the procedure of Example 2 is repeated, except that in part (cL) heating is carried out at a temperature of 80° C. for 16 hours with similar results.

EXAMPLE 11

The procedure of Example 2 is repeated, but using amounts of water in part (c) varying from 750 ml. to 4 liters, with similar results.

EXAMPLE 12

The procedure of Example 2, parts (a) and (b) is repeated, but (c) is replaced by the following:

400 g. of the final powder product of (b), containing 380 g. plastein, is mixed with 40 g. ribose, 80g. monosodium glutamate and 2 liters of water, heated at 100° under reflux, cooled and the solution made up to 2.53 liters with water. The product is again an aqueous solution containing about 20% by weight of a flavoring agent according to the invention, and comprises 15% (g/100 ml.) plastein.

EXAMPLE 13

The procedure of Example 2, parts (a) and (b), is repeated, but (c) is replaced by the following:

200 g. of the final powder product of (b), containing 190 g. plastein, is mixed with 20 g. glucose, 40 g. monosodium glutamate and 4 liters of water, heated at 100° for 20 hours, cooled and the solution made up to 5 liters with water. The product is an aqueous solution containing about 5% by weight of a flavoring agent according to the invention, and comprising 3.8% (g./100 ml.) plastein.

EXAMPLE 14

The procedure of Example 13 is repeated, except that heating is carried out (under elevated pressure) at a temperature of 120° for 5 hours, with similar results.

EXAMPLE 15

Preparation of Flavored, Textured Vegetable Protein (TVP)

A mixture of 10 g. dry, textured soya protein (produced by extruding wet soya flour or grits under high pressure at a temperature above 100° C.), 0.1 g. of the freeze-dried product of Example 1 and 25 ml. of a 10% (10 g./100 ml.) aqueous solution of "Corral" beef flavor paste are heated in a stoppered tube at 90° for 2 hours.

The product, which is a re-hydrated, texturized vegetable protein containing the equivalent of 7% "Corral" beef flavor paste and 0.3% of a flavoring agent according to the present invention (based on the wet weight of the product) has the taste and texture of cooked beef and has long-lasting beef flavor.

A similar product made with Corral beef flavor paste alone, without the flavoring agent of the present invention, has a similar flavor which is much more quickly lost on chewing and is therefore an inferior product.

Corral beef flavor paste is a product sold by Pfizer Inc. of New York, New York, U.S.A. and is a flavoring composition made in accordance with the disclosure in U.S. Pat. No. 3,365,306 and U.K. Pat. No. 1,135,123.

EXAMPLE 16

When the procedure of Example 15 is repeated with 0.05%, 0.1%, 0.5%, 0.75%, 2%, 5%, 6% 7%, 10% and 20% of the freeze dried product of Example 1 (percentages based on weight of dry, textured soya protein) and the rehydrated texturized protein products evaluated for flavor quality and duration, the following results are obtained.

| Weight % of Product of Example 1 | Comments |
| --- | --- |
| 0.00 (control) | meaty, non-persistent. |
| 0.05 | meaty, not appreciably different from control. |
| 0.1 | meaty, slightly longer lasting than control. |
| 0.5 | meaty, appreciably persistent. |
| 0.75 | meaty, persistent. |
| 2 | meaty, persistent. |
| 5 | meaty, persistent. |
| 6 | meaty, persistent. |
| 7 | meaty, persistent, trace of bitterness. |
| 10 | meaty, persistent, trace of bitterness. |

-continued

| Weight % of Product of Example 1 | Comments |
|---|---|
| 20 | meaty, persistent, but bitter tasting. |

EXAMPLE 17

When the procedure of Example 15 is repeated, but the textured soya protein is replaced in each case by textured safflower protein, textured peanut protein, textured cottonseed protein or textured casein, similar results are obtained.

EXAMPLE 18

One part of dry textured soya protein product produced as in Example 15 is re-hydrated with two parts (by weight) of an aqueous solution of either Corral beef (or chicken) flavor paste alone or Corral beef (or chicken) flavor paste and a product of one of Examples 2, 12 or 13, to give a flavored product containing the amounts of flavoring material (or materials) shown in Table I as wt % Corral paste or plastein content of product of Examples 2, 12, or 13, based on the weight of hydrated product. The flavored products are tested for flavor quality and persistence on chewing by panels of judges, scored on an arbitrary scale for quality and ranked for persistence in each of the groups (A) to (E) containing different proportions of a Corral flavor and a flavor of the present invention. Results are also shown in Table I.

TABLE I

|  | (1) | (2) | (3) |
|---|---|---|---|
| (A) "Corral" beef flavor paste, % | 4.5 | 3.6 | 2.7 |
| Product of Example 2, % plastein | 0.0 | 0.5 | 1.0 |
| Flavor score | 102 | 116 | 129 |
| Mean rank for persistence | 2.33 | 2.00 | 1.67 |
| (B) "Corral" beef flavor paste, % | 2.8 | 2.3 | 1.8 |
| Product of Example 2, % plastein | 0.0 | .26 | .50 |
| Flavor score | 102 | 118 | 121 |
| Mean rank for persistence | 2.50 | 2.0 | 1.50 |
| (C) "Corral" chicken flavor paste, % | 4.5 | 3.6 | 2.7 |
| Product of Example 2, % plastein | 0.0 | 0.5 | 1.1 |
| Flavor score | 116 | 128 | 142 |
| Mean rank for persistence | 2.43 | 1.86 | 1.71 |
| (D) "Corral" beef flavor paste, % | 4.5 | 3.6 | 2.7 |
| Product of Example 12, % plastein | 0.0 | 0.5 | 1.1 |
| Flavor score | 112 | 125 | 132 |
| Mean rank for persistence | 2.50 | 1.95 | 1.55 |
| (E) "Corral" beef flavor paste, % | 4.5 | 3.6 | 2.7 |
| Product of Example 13, % plastein | 0.0 | 1.0 | 2.0 |
| Flavor score | 102 | 133 | 150 |
| Mean rank for persistence | 2.80 | 1.80 | 1.40 |

The results of these tests show that products flavored with a combination of a Corral flavor and a flavoring agent of the present invention not only have an improved flavor compared with products flavored with Corral alone, but also have a greater persistence of flavor on chewing, the degree of persistence increasing with the proportions of flavoring agent according to the present invention. It is also apparent that the products of Examples 2 and 12 (derived from supplemented plastein and ribose) have approximately twice the flavoring strength (weight for weight) of Corral paste while that of Example 13 (derived from supplemented plastein and glucose) has an approximately equivalent flavoring strength to Corral paste.

EXAMPLE 19

Defatted soya grits (10 parts by weight) were contacted with water (2.5 parts by weight) containing in solution the amounts of Corral beef flavor paste or a product of one of Examples 2, 12 or 13 shown in Table II as wt % Corral paste or plastein content of product of Examples 2, 12 or 13, based on the weight of dry product. The hydrated products were then extruded at 130°–140° and 1000 p.s.i. to form dry, textured vegetable protein products which were then tested for nature and persistence of flavor.

Results are shown in Table II.

TABLE II

| Flavoring Agents | % | Flavor of Product |
|---|---|---|
| "Corral" beef flavor paste | 5.5 | soya-like (unflavored) |
| "Corral" beef flavor paste | 11.0 | meaty, non-persistent |
| Product of Example 2 | 1.3 | meaty, persistent |
| Product of Example 2 | 2.6 | meaty, persistent |
| Product of Example 12 | 2.6 | meaty, persistent |
| Product of Example 13 | 5.2 | meaty, persistent |

The results show that the beef flavor of the Corral paste only survives the extrusion conditions when a very large amount (11%) of paste is incorporated, whereas amounts of flavoring agents according to the present invention equivalent to 2.6% or 5.2% Corral paste result in flavored extruded products. Moreover, the latter have a persistent flavor on chewing, whereas even the product initially containing 11% Corral paste did not impart a persistent flavor to the extruded product on chewing.

EXAMPLE 20

The procedure of Example 19 is repeated but the defatted soya grits are extruded at 100° and 3,000 p.s.i., 130° and 300 p.s.i., and 150° and 500 p.s.i. and 120° and 2,000 p.s.i. with similar results.

EXAMPLE 21

When the procedure of Example 19 is repeated but the defatted soya grits is replaced in each case by defatted safflower meal, defatted peanut meal, defatted cottonseed meal, defatted sesame seed meal, a mixture of casein and corn meal containing 60% protein, a mixture of microbial protein (single cell protein available from Exxon) and wheat flour containing 65% protein or a mixture of fish protein concentrate and wheat flour containing 45% protein, comparable results are obtained.

EXAMPLE 22

Dry, textured soya protein product is re-hydrated (as in Example 18) with aqueous solutions of Corral beef flavor paste, alone or with varying amounts of products of Examples 2, 12 or 13 to give flavored products containing the amounts of flavor shown in Table III, expressed as wt % plastein content based on the weight of the hydrated product.

TABLE III

| Product | Flavoring Agent of Invention | "Corral" Beef Flavor Paste |
|---|---|---|
| (A) | — | 4.5% |
| (B) | — | 6.0% |
| (C) | Example 2, 1.0% | 2.6% |
| (D) | Example 2, 1.2% | 3.6% |
| (E) | Example 2, 1.5% | 3.6% |
| (F) | Example 12, 1.0% | 2.6% |
| (G) | Example 13, 2.0% | 2.6% |

EXAMPLE 23

Defatted soya grits (10 parts by weight) are contacted with water (2.5 parts by weight) containing in solution a product of one of Examples 2, 12, or 13, with or without Corral beef flavor paste, in the amounts shown in Table IV, (as wt % based on the weight of dry product, as in Example 19). The hydrated products are then extruded as in Example 19 and re-hydrated with 20 parts by weight of water containing in solution 0.5 parts by weight of Corral beef flavor paste, thereby adding 5% Corral beef flavor paste (based on the dry weight of product) to the flavoring agent or agents already present.

TABLE IV

| Product | Ex. | Flavoring Agent of Invention wt % dry* | wt % wet** | "Corral" Beef Flavor Paste wt % dry* | wt % wet** |
|---|---|---|---|---|---|
| (H) | 2 | 1.3 | 0.43 | — | 1.67 |
| (J) | 2 | 1.3 | 0.43 | 3.3 | 2.77 |
| (K) | 12 | 1.3 | 0.43 | 3.3 | 2.77 |
| (L) | 13 | 2.6 | 0.87 | 3.3 | 2.77 |
| (M) | 2 | 2.6 | 0.87 | — | 1.67 |
| (N) | 12 | 2.6 | 0.87 | — | 1.67 |
| (P) | 13 | 5.2 | 1.73 | — | 1.67 |
| (Q) | — | — | — | — | 1.67 |
| (R) | — | — | — | — | 3.40 |

*before extrusion
**after re-hydration, including additional "Corral"

For comparison, extruded products (Q) and (R) are also made by the same method, but in which no flavoring agent is added before extrusion and sufficient Corral beef flavor paste is added during re-hydration, to give 1.67% or 3.4% "Corral", respectively, based on the wet weight of the product.

Various pairs of the products (A) to (R) of each of Examples 22 and 23 have been tested for flavor quality and persistence by panels of judges by the triangular method, i.e., two samples of one product of each pair and one sample of the other product are submitted to the members of each panel and, if one sample is correctly identified as being different from the other two, then a judgment is made either of the quality or of the persistence of its flavor in comparison with that of the other two.

By this method, it has been found that, for the products of Example 22, product (C) has a significantly better quality beef flavor than product (A), with similar flavor strength. Products (D) and (E) also have significantly better quality beef flavors than product (B) with similar flavor strengths.

Moreover, product (D) has a significantly more persistent beef flavor on chewing than product (B). Products (F) and (G) also have good quality beef flavors, though that of product (C) is significantly better than that of product (F) and that of product (F) is significantly better than that of product (G).

All thr products of Example 23 have beef flavors of good quality and all but products (Q) and (R) have flavors which are persistent on chewing. It has been found, however, that products (H) and (J) have significantly better quality flavors than product (Q), while the flavor of product (J) is not significantly different from that of product (N), confirming that Corral included in the product before extrusion has no effect on the flavor of the product, after extrusion. Products (K) and (L) also have good quality beef flavors, though that of product (J) is significantly better than that of products (K) and (L) which have flavors of similar quality. Products (M) and (P) have significantly better quality and significantly more persistent flavors on chewing than product (R). Product (M) has a significantly better quality flavor that product (P), while that of product (N) is similar to that of product (P).

What is claimed is:

1. A process for preparing a flavoring agent which comprises reacting a mixture of one part by weight of a hexose or pentose monosaccharide and from about one to twenty parts by weight of a plastein supplemented with about 5 to 50% by weight, based on the supplemented plastein, of a sulfur-containing amino acid which is held in a state of peptide bonding to said plastein and which acid is selected from the group consisting of methionine, cysteine, cystine and lanthionine, in water as the reaction medium, the amount thereof providing at least about two parts by weight of water for each part of said supplemented plastein, at a temperature from about 80° to 120°C.

2. A process according to claim 1 wherein said hexose, or pentose monosaccharide is selected from the group consisting of glucose, ribose and arabinose.

3. A process according to claim 1, wherein the weight ratio of said monosaccharide to said supplemented plastein is from about 1:4 to 1:10.

4. A process according to claim 3, wherein said weight ratio is about 1:10.

5. A process according to claim 1 wherein monosodium glutamate is included as a flavor modifier in said mixture.

6. A process according to claim 5, wherein the weight ratio of monosodium glutamate to plastein is from about 1:1 to 1:10.

7. A process according to claim 6, wherein said weight ratio is about 1:5.

8. A process according to claim 1, wherein said monosaccharide is ribose or arabinose and the weight ratio of water to supplemented plastein is about 5:1.

9. A process according to claim 1, wherein said monosaccharide is glucose and the weight ratio of water to supplemented plastein is about 20:1.

10. A process according to claim 1, wherein the amount of said sulfur-containing amino acid is from about 15 to 20% by weight based on the supplemented plastein.

11. A process according to claim 1, wherein the source of said sulfur-containing amino acid employed in supplementing said plastein is an alkyl ester or alkyl ester salt of said sulfur-containing amino acid; said alkyl having from about one to four carbon atoms.

12. A flavoring agent prepared by the process of claim 1.

13. A meat-flavored textured protein composition comprising a textured protein having incorporated therein from about 0.1 to 10% by weight based on the dry weight of textured protein, of said flavoring agent of claim 12.

14. A meat-flavored textured protein composition comprising a textured protein having incorporated therein from about 0.75 to 6% by weight based on the dry weight of textured protein, of said flavoring agent of claim 12.

15. A meat-flavored textured protein composition according to claim 13, wherein after said flavoring agent is incorporated, the mixture is extruded at a pressure of from about 300–3000 pounds per square inch and at a temperature in the range of about 100° to 150° C.

16. A composition according to claim 13, wherein said protein is vegetable protein.

17. A composition according to claim 16, wherein said vegetable protein is soya protein.

* * * * *